US007552448B2

(12) United States Patent
Wilson

(10) Patent No.: US 7,552,448 B2
(45) Date of Patent: *Jun. 23, 2009

(54) METHOD AND APPARATUS FOR CONDUCTING DATA TRANSACTIONS BETWEEN MULTIPLE PROGRAMS

(75) Inventor: Timothy Wilson, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 937 days.

This patent is subject to a terminal disclaimer.

(21) Appl. No.: 10/463,354

(22) Filed: Jun. 17, 2003

(65) Prior Publication Data

US 2004/0010790 A1 Jan. 15, 2004

Related U.S. Application Data

(62) Division of application No. 09/474,405, filed on Dec. 29, 1999, now abandoned.

(51) Int. Cl.
G06F 3/00 (2006.01)
G06F 9/44 (2006.01)
G06F 9/46 (2006.01)
G06F 13/00 (2006.01)

(52) U.S. Cl. .................. 719/319; 719/313; 707/10; 709/246

(58) Field of Classification Search ............ 719/313, 719/319; 707/10; 709/246
See application file for complete search history.

(56) References Cited

U.S. PATENT DOCUMENTS 6,477,559 B1 * 11/2002 Veluvali et al. ............. 718/101
6,637,020 B1 * 10/2003 Hammond .................. 717/107
6,687,878 B1 * 2/2004 Eintracht et al. ............ 715/512
6,697,815 B1 * 2/2004 Wilson ....................... 707/102
2002/0091788 A1 * 7/2002 Chlan et al. ................ 709/213
2005/0004978 A1 * 1/2005 Reed et al. ................. 709/203

OTHER PUBLICATIONS

Microsoft, Understanding Remote Data Service Applications, 1997, pp. 1-7.*
Brackenbury et al, IBM's Enterprise Server for Java, IBM Systems Journal, vol. 37, No. 3, 1998, pp. 323-335.*

(Continued)

Primary Examiner—Li B Zhen
Assistant Examiner—Diem K Cao
(74) Attorney, Agent, or Firm—Saul Ewing LLP

(57) ABSTRACT

A method and apparatus for conducting business via the worldwide Web in which business programming is isolated from Web user interface programming. In accordance with the invention, a gateway servlet interfaces between a consumer's browser's software, a plurality of Java beans, Java Server Pages, and a e-business retailer's back-end business software running, for instance, on a separate mainframe. The gateway servlet receives input information from the consumer and instantiates and populates a Java bean that confirms that the input data has been entered correctly. It then forwards the verified input data the back-end software for business processing. The back-end software returns a user interface record object to the gateway which then instantiates and populates another Java bean to format the data. The gateway then invokes a Java Server Page that interfaces with the Java bean in order to generate a HTML page to be returned to the user based on the user input information and the business back-end processing thereof.

8 Claims, 2 Drawing Sheets

OTHER PUBLICATIONS

Pawlan, Working with Entity and Session Beans, Sun Microsystems, Nov. 1998, pp. 1-9.*

Shoffner, Write a Session EJB, Javaworld.com, Jul. 1, 1998, pp. 1-11.*

Thomas, Enterprise JavaBeans Technology—Server Component Model for the Java Platform, Patricia Seybold Group, Dec. 1998, pp. 1-24.*

Duffy et al, A Distributed Object Framework for Financial Applications, IEEE, 1998, pp. 148-154.*

Shah et al, Symphony: A Java-based Composition and manipulation framework for distributed legacy resources, May 1999, pp. 1-11.*

Sun Microsystems, JavaServer Pages—Specification 0.92, Oct. 7, 1998, pp. 1-47.*

Bayeh, The WebSphere Application Server architecture and programming model, IBM Systems Journal, vol. 37, No. 3, 1998, pp. 1-11.*

Gottschalk, Technical overview of IBM's Java initiatives, IBM Systems Journal, vol. 37, No. 3, 1998, pp. 1-12.*

Brackenbury et al, IBM's Enterprise Server for Java, IBM Systems Journal, vol. 37, No. 3, 1998, pp. 1-11.*

* cited by examiner

METHOD AND APPARATUS FOR CONDUCTING DATA TRANSACTIONS BETWEEN MULTIPLE PROGRAMS

RELATED APPLICATION DATA

This Application is a divisional of and claims priority to U.S. application Ser. No. 09/474,405, filed Dec. 29, 1999.

FIELD OF THE INVENTION

The invention relates to software application development and run time environments. More particularly, the invention pertains to World Wide Web application development and run time environments.

BACKGROUND OF THE INVENTION

The recent explosion in use of the World Wide Web (hereinafter the Web) has created a increased need for Web application software developers. One of the largest growth areas in the Web and Web application software development has been in the transaction of business over the Internet, including both retailer to consumer transactions and business to business transactions. For instance, many traditional businesses have added an Internet site to their stable of retail outlets through which consumers can purchase goods. In addition, many new businesses have "opened up" on the Web that have no traditional, physical, retail outlets, but transact business solely (or at least primarily) over the Web. Examples of such Web business sites include Amazon.com which sells primarily books and other entertainment media, CDNow.com which sells primarily compact discs, and Etoys.com which sells primarily children's toys.

The transaction of business via the Web is commonly referred to as e-business. In a typical e-business, a company maintains and operates a Web site that can be accessed by potential consumers using Web browser software such as Netscape Navigator or Microsoft Explorer. A user accesses a retailers' Web site in the normal fashion, such as by clicking on a hyperlink from another Web site (e.g., a search engine results page) or typing in that Web site's URL (Universal Resource Locator) into the appropriate field on a screen display provided by the browser software. The Web host server on which the requested Web page resides returns a Web page to the user's computer (herein termed client machine) which then displays the selected Web page on the user's monitor.

For exemplary purposes, let us assume that a user accesses a home page of an e-business retailer that sells compact discs. The home page typically will contain graphics, text and various hyperlinks to other Web pages, including at least one page that can be used for entering an order for one or more compact discs. When the user clicks on that particular hyperlink, it causes the browser software to send a request over the network to the relevant Web server for that page. The Web server returns that page to the client machine for display on the consumer's monitor. The page would typically include a plurality of questions and fields in which the consumer is to fill in information in answer to those questions, such as name, address, telephone number, credit card number, the artist and title of the desired compact disc, etc.

After the user has entered all of the required information, he will click on a button on the screen which causes the data which he just entered to be sent back to the Web server. This data essentially is a purchase order for a compact disc. At this point, the e-business retailer must process the purchase order, for the most part, in the manner that it would process any purchase order regardless of the medium through which it was received, (via the internet, via mail order, or via a consumer walking up to a cash register in a physical retail outlet). Such processing typically would include at least (1) confirmation of the credit card number and availability of enough credit to cover the purchase price of the item, (2) confirmation with an inventory database that the ordered compact disc exists and is in stock, (3) entry of all of the information in appropriate databases for purposes of tracking stock for tax and business purposes, and (4) notification of appropriate personnel in the order processing and shipping departments so that the purchase order can be physically processed to mail the compact disc to the consumer.

The software for generating and displaying the Web pages and interacting with the consumer, i.e., user interface software, may generally be termed Web software, while the software for carrying out the business transaction may generally be termed business software.

It can be seen from this example that software development for an e-business application requires knowledge of both business software development and Web software development. Historically, however, business software developers and Web software developers have worked in separate realms. That is, most business software developers know little about Web software development while Web software developers know little about business software development. As one example, business software developers typically develop software using languages such as COBOL or C++, whereas Internet software developers commonly use the HTML (Hypertext Markup Language) and Java programming languages.

In addition, a company that, prior to commencing retailing over the Web, had transacted business in more traditional fashions, such as, through physical retail outlets or mail order, usually will already have a completely developed, reliable, and familiar business software package. In order to transact business via the Web such a company typically would need to develop an entirely new software package based on HTML in order to transact e-business. Accordingly, both companies that conduct strictly e-business as well as traditional companies that are expanding into e-business must employ Web software developers to develop the software for transacting their business over the Web. Such developers commonly have little knowledge of the business aspects of the necessary software. Accordingly, companies either must employ both business software developers who typically know little about Web software development as well as Web software developers who know little about business software development or employ either type of developer and expend significant effort in training the developer in the field in which he or she is not familiar. In either event, there are significant inefficiencies in the software development.

There are numerous available mechanisms by which the business software portion may interact with the Web software portion of an e-business. For instance, many e-business developers utilize CGIs (Common Gateway Interfaces) that interface between the web-browser and a business application program. A CGI is a program which passes a Web user's request to an application program and receives data back from the application program for forwarding to the user. When a user fills out a form such as to order a compact disc it is more than a request for a page to be returned. Specifically, the data entered by the user must be processed by a business application program before the company's Web server can return to the user's browser a customized response, e.g., the requested compact disc is in stock, it will be shipped by a certain date, and the user's credit card will be charged a certain amount. With a CGI type system, the Web server passes the information entered by the user to a small business application program running on the Web server which then processes the data and sends back to the CGI a Web page containing a confirmation message.

The software for passing data back and forth between the server and the business application program is called a Common Gateway Interface or CGI and is part of the Web's Hypertext Transfer Protocol (HTTP). A CGI provides a consistent way for data to be passed from the user's request to the business application program and back to the user. Since the interface is consistent, a programmer can write the business application in a number of different languages. The most common language for CGI applications are C, C++, Java and Perl. The business application program is a regular program that understands HTML and, upon receipt of the information entered by the user, builds an HTML page to send back to the user. Thus, a business application program when used with a CGI type interface performs a combination of business processing as well as building the Web page to be sent back to the user's browser.

Another common scheme for e-business applications is to use Java servlets that run on the Web server. The Java servlet replaces the CGI and runs directly on the Web server. With a Java virtual machine running in the server, e-business application programs can be implemented on the server using the Java program language. The advantage of a Java servlet running on a server over CGI, for example, is that they can execute more quickly than CGI applications. Specifically, rather than causing a separate program process to be created, each user request is invoked as a thread in a single deamon process, meaning that the amount of system overhead for each request is small. However, the Java servlet performs both business processing and building of Web pages.

Another well known method is the use of ASPs (Active Server Pages). An Active Server Page is a HTML page that includes one or more scripts that are processed on a Microsoft Web server before the page is sent to the user. It is similar to a Java servlet as discussed above in that all involved programs run on the server. The script in the Web page at the server uses the input data received as a result of the user's request for the page to access data from a database and builds or customizes the page on the fly before sending it to the user's browser. Again, however, the ASP performs both business processing and Web page building.

In all of the above scenarios, a software development team having knowledge of Web programming, Java, HTML, HTTP, etc., as well as business software development is needed. Further, a company's existing business software may be completely useless for e-business.

Accordingly, it is an object of the present invention to provide a run time environment method and apparatus and framework for e-business software applications that provides significant separation of business software development from Web software development.

SUMMARY OF THE INVENTION

The invention is a new program/data structure for application program specification and run time execution that facilitates the separation of business software development from Web software development. In accordance with the invention, a simple gateway servlet program running on a Web server interfaces between the user's browser and a back-end computer which performs all of the business data processing, one or more Java beans, and one or more Java Server Pages (JSPs). When a user enters information into a page and sends it back to the Web server, this gateway servlet receives the information and instantiates a Java bean designed to handle the input data, such as to verify the data. The gateway servlet populates the bean with the input data returned from the user. The bean includes a set of methods to perform whatever steps are necessary to verify or otherwise process the input data before it is processed by business processing software. This may include confirming data consistency across fields (cross-verification), confirming the proper number of characters in fields, confirming that data entered in various fields is within any range limits that might apply and the like, but performing no business processing. The bean returns a PASS/FAIL decision to the gateway, including, in the case of a FAIL, information as to the reason(s) for the FAIL. If a FAIL, the gateway program, invokes another program to return a page to the user seeking correction of the problems.

If a PASS, the gateway sends the input data to a back-end computer along with information telling the back-end computer what business program (or programs) to invoke to process that data. The back-end computer then runs the program using the input data provided to it by the gateway servlet. When the program has finished running and the desired business output data has been generated, the back end computer populates a User Interface (UI) record with the output data. The back-end computer sends the UI record data to the gateway servlet.

The gateway servlet instantiates a Java bean that has been designed for that particular data-set/object, and sets the data of that UI record into the bean. This Java bean defines a set of methods that have been defined to manipulate the business data and return META information about the business data, but does not include any intelligence about how the data will be presented to the user.

The gateway servlet then invokes a Java Server Page (JSP) also resident at the Web server that has been developed to operate with that bean. The JSP defines the manner of presenting the data to the user and, specifically, generates a HTML page using the information in the aforementioned bean to customize the page in accordance with the output data from the bean and returns that page to the user's browser for display at the user's machine.

In this manner, the Web-based user-interface processing is entirely separated from the business processing, which is entirely separated from the data formatting and verification operations. The interaction between the business processing software, the formatting software, the verification software, and the user interface processing is through a very simple gateway servlet. Thus, a Web developer can develop the user interface (i.e., the HTML pages and how they relate to one another) essentially without the need to have any knowledge of the business software that generated the business data and the business software developer can develop all of the business processing software essentially independently of the Web software developer. An even further software developer can essentially independently develop the output data formatting software and the input data verification software in the form of Java beans.

DETAILED DESCRIPTION OF THE INVENTION

Figure 1:
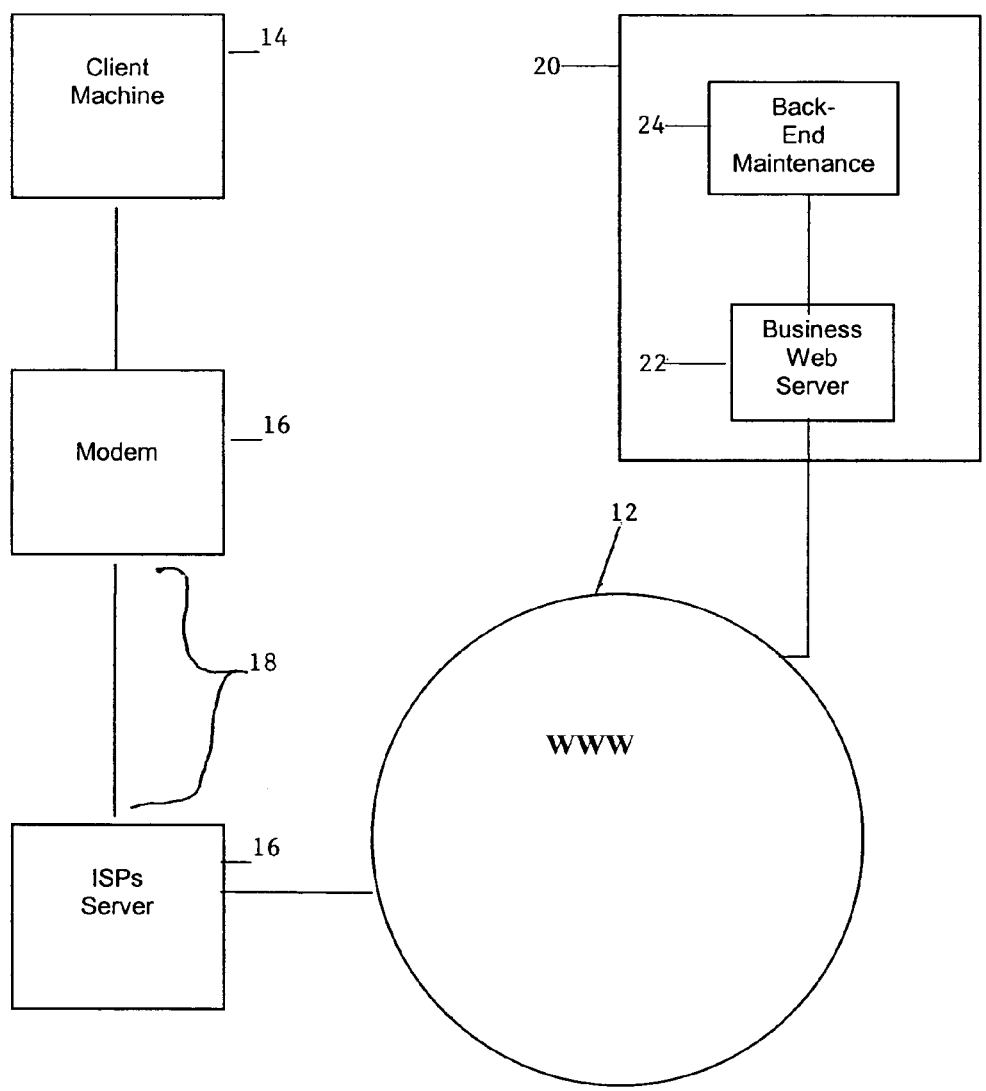
FIG. 1 is a block diagram illustrating the relevant components for an e-business transaction over the Web in accordance with the present invention.

FIG. 1 is a block diagram illustrating components involved in an exemplary business transaction conducted via the World Wide Web Wide Web. A user working at a client machine 14 accesses a server 16, for example, through the public telephone network 18 using a modem 20. The server 16 typically is operated by the user's Internet Service Provider (ISP). The ISP may have another modem (not shown) to interface to the user's modem 20. The ISP is coupled to the Web 12 and transfers data between the user's client machine 14 and destinations selected by the user that are accessible via the Web. The World Wide Web 12 is a collection of switches, routers and computers forming a computer network that essentially spans the globe. The general organization of the Web is well known and does not form part of the present invention and is therefore not discussed herein. Businesses such as business 20 also are connected to the Web by a Web server such as Web server 22 and maintaining a plurality of Web pages that can be accessed by others via the World Wide Web. For exemplary purposes let us assume that business 20 is a compact disc retailer that maintains its own Web server at its own physical plant and connects directly to the Web 12 without using the public telephone network.

A user running World Wide Web browser software such as Netscape Navigator or Microsoft Internet Explorer on a client machine 14 can access any page on the World Wide Web. When the user wishes to access a certain page on the Web, for example, the home page of compact disc retailer 20, the user types in the Universal Resource Locator (URL) for that page in the appropriate field of a display screen presented by the browser software or, alternately, clicks on a hyperlink in another Web page that is currently being viewed that directs the browser software to the home page of business 20. The browser software sends a request for that URL to the ISP's server 16. The ISP's server 16 converts the URL into an alpha-numeric address and sends the request out on the Web 12 to the particular server 22 identified by the alpha-numeric address. In response to the request received from the user's browser software via the user's client machine 14, the ISP's server 16 and the Web 12, the retailer's server 22 returns a HTML (Hypertext Markup Language) page to be displayed on the user's computer terminal. A home page typically does not require the user to input any information.

The home page typically comprises graphics and text and one or more hyperlinks to other Web pages on the retailer's server 22. At least some of the Web pages referenced by hyperlinks on the home page typically will be pages in which the user can enter information to be sent to the retailer 20 necessary for purchasing a compact disc (hereinafter input information). When a user clicks his mouse on one of these hyperlinks (which is essentially a shorthand method of requesting another URL), the newly selected Web page is returned to the user via the same type of processing described above with respect to accessing the home page. In short, the request is received at the retailer's server 22 and the retailer's server returns a page in which the user can enter certain information needed in order to purchase a compact disk. Typically this page will include various fields in which the user must enter the appropriate information (name, address, desired compact disc, credit card number and expiration date, etc.). After the user enters all of the requested input data, the user clicks his mouse on a certain button (e.g., a send button) which causes the browser software to forward the input information back to the retailer's server 22.

The retailer's server is also coupled to a retailer's back-end computer on which the retailer's business software runs. For example, the back-end computer may be a mainframe computer 24 at the retailer's business location.

In the prior art, the user interface and the business processing programming were intertwined and ran on the retailer's Web application server. In the prior art, the Web server might access a database maintained on a separate, backend, mainframe. However, the actual processing of the data obtained from the database was performed at the server in a programming environment in which the user interface, input data verification, business processing to generate output data, and formatting of the output data were intertwined in the same software (e.g., by a CGI application program or ASP program).

In accordance with the present invention, all of the business processing can remain in a back-end computer while all of the user interface programming (Web programming) is performed at the Web server, for example, by a Java Server Page. Further, all of the other processing of the input and output data that is neither user interface processing or business processing can be performed by one or more other independent programs, such as one or more Java beans. Such other processing may include formatting of output data, validation of data, and cross-verification of multiple interdependent fields of input data. All of these various programs interface to each other via a very simple gateway servlet program, that performs almost no processing of data other than receiving and transmitting data between the various browsers, Java beans, Java Server Pages, and business processing programs.

In this manner, the Web software developers and the business software developers can operate essentially independently of each other, thus allowing each developer to most efficiently use his or her skills without the need to worry about the other. In addition, with respect to existing businesses that already have highly developed and reliable business software, such a business does not need to develop new business software in order to transact business via the Web. Instead, it can simply use its existing well-established business software and separately develop user interface software for the Web.

While the examples discussed herein relate to situations in which the business software is resident on a separate, back-end computer, e.g., a mainframe, the business processing software could just as easily run on the Web server itself. It is the logical separation of the business processing software, Web user-interface software, data formatting software, input data validation, and other software more than the location at which they run that provides the primary advantages of the present invention.

Figure 2:
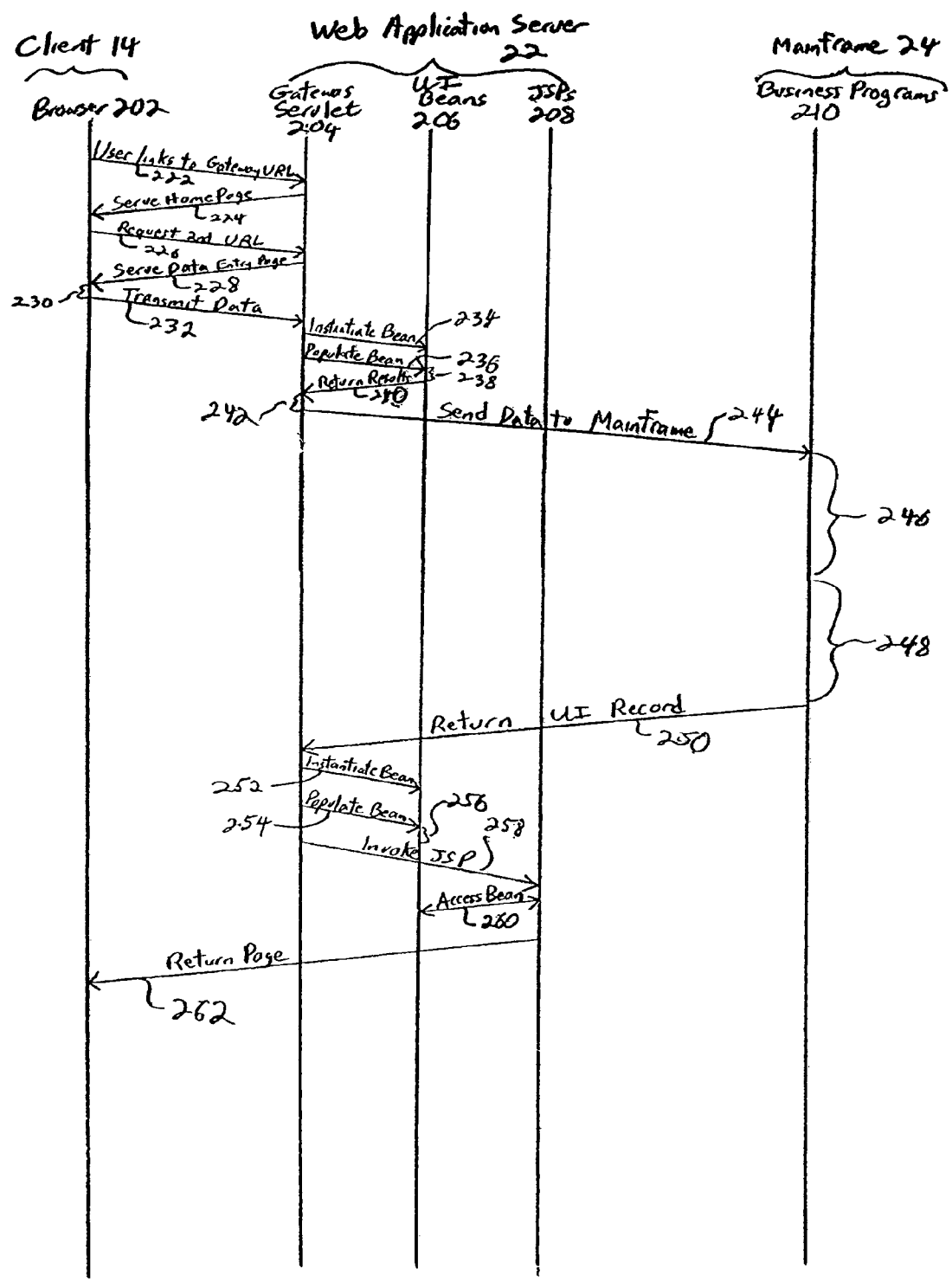
FIG. 2 is a flow diagram illustrating the flow of processing in accordance with a preferred embodiment of the present invention.

Reference is now made to FIG. 2 which is a flow diagram illustrating the interaction between the user's browser software running on the client machine 14, various programs running on the retailer's server 22, and various programs running on the retailer's mainframe 24. In order not to obfuscate the invention, the ISP's server 16 and the Web 12 are not illustrated in FIG. 2. The details of those interactions are well known and do not form part of the present invention. Tower 202 represents the browser software running at the user's client machine 14. Towers 204, 206 and 208 represent software running at the retailer's Web server 22. Tower 204 represents a particular Java servlet in accordance with the present invention, herein termed a gateway servlet and described in more detail below. Tower 206 represents one or more beans resident on the retailer's Web server. Tower 208 represents one or more Java server pages (JSP) programs for generating HTML pages and also is resident on the retailer's server. Tower 210 represents the retailer's business software and comprises one or more application programs which, for example, may be running on the back-end mainframe 24.

In step 222, responsive to the user typing the appropriate URL (or clicking on a hyperlink), the user's browser links to the gateway servlet 204 running on the retailer's Web server 22. In step 224, the gateway servlet serves the retailer's home page back to the browser. In step 226, the user selects a hyperlink in the home page to obtain a page in which he can enter his order and other relevant information, such as name, address, e-mail address, requested compact disc(s), credit card number, credit card expiration date, requested shipping method, shipping address, etc.

In step 228, the gateway servlet 204 serves that page back to the user's browser for display at his terminal by his browser. In step 230, the user fills in the requested information in various fields. The user then clicks on a send button in the page which results in the browser sending the entered information back to the gateway servlet 204 at the retailer's Web application server (step 232). As in the prior art, the send button essentially is a disguised hyperlink identifying a specific URL. However, in accordance with the invention, that URL additionally includes the identity of the program or programs in the back-end 24 that need to be run in order to process the data.

The gateway servlet 204 receives the information entered in the data fields by the user (hereinafter input data). In step 234, the gateway servlet instantiates a bean designed to process the input data as needed. In step 236, the gateway populates the bean with the input data. As is well known in the art of Web software development, Java is an object oriented programming language in which a Java bean is a small program that is a class, i.e., a set of attributes (data) and a set of methods (what to do with the data). When another program, such as the gateway servlet, populates a particular bean with data, a new instance of that bean is created. Each instance of that bean has different data (attributes) but the same processes (methods).

In accordance with the invention, the beans do not perform business processing. However, they preferably perform all other processing of the input data. This might include checking if the proper number and/or type of characters have been entered in any field in which the number of characters must meet certain limitations. For instance, credit card numbers must have 16 digits and they must all be numbers; a name must be comprised entirely of alphabetical characters; dates must be entered in a certain format; e-mail addresses must be of a certain format; a U.S. zip code must have 5 or nine numeric digits; etc. Further, some fields may be interdependent. The consistency of the data in such fields can be verified by the bean.

In step 238, the selected bean runs. After running, in step 240, the bean returns a PASS or FAIL indication to the gateway servlet. If it returns a FAIL, the gateway servlet must send the same page back to the user preferably including an indication of the fact that there is an error in the input data that must be corrected and identifying the nature of the error and the field(s) in which it occurred so that the user can correctly enter the data and resubmit the page. For purposes of simplifying FIG. 2, we shall assume that the input data is correct and, therefore, the bean returns a PASS in step 240.

The input data entered by the user now must be processed for business purposes in order to, for instance, verify the credit card number and availability of adequate credit, determine whether the retailer has the requested CD in stock, create a purchase order, notify the appropriate personnel, generate the output data that must be returned to the user, such as total cost and shipment data.

In step 242, responsive to receipt of the request from the browser, the gateway servlet 204 creates a request object. The request object specifies what program or programs must be run on the back-end to process the data. In step 244, the gateway servlet 204 sends the input data entered by the user to the back-end server along with the identity of the program or programs that must be run to process that data.

In step 246, the back-end server runs the necessary program(s). In step 248, the back-end mainframe then populates a data structure which we call a user interface (UI) record with the output data that is to be returned to the user. The populating of the UI record can be performed by a separate program running on the back end. Alternately, it may be included within the business application program. In an object-oriented programming language, the UI record is an object.

The UI record is the model for the Web page that is to be returned to the user. That is, it is a high level object defining data and the behavior associated with that data, but not the layout or appearance of that data. If the back-end software is written in the COBOL language, for example, then the UI record may be a COBOL record.

In the example that we have been using, the UI record may contain, for instance, the SKU for the desired compact disc, the full name of the artist and the title of the CD, a list of songs on the CD, the price of the CD, an indication of approval or rejection of the credit card, the total cost, possibly follow-up questions which the user may need to answer, etc.

Since the back-end has no interaction with the user interface other than populating the UI record, the back-end software requires almost no redesign. The UI record contains the data which is to be returned to the user's browser and specifies what should happen to it, but contains no information at all about how it is to be presented to the user. Further, it preferably contains no information about how it is to be formatted. Although, in alternate embodiments, data formatting can be performed in the back-end.

The data generated at the back-end that is contained in the UI record now must be inserted into a Web-based user interface. Accordingly, at least some of the information contained in the UI record concerning what should happen to the data identifies a bean and a Java Server Page (JSP) that are to be used to build a Web page for presenting the data to the user.

In step 250, the back-end computer returns the populated UI record to the gateway servlet.

In step 252, the gateway instantiates the identified bean (hereinafter termed UI bean). In step 254, it populates that UI bean with the data from the UI record.

In step 258, the gateway servlet 204 invokes the identified Java Server Page. The Java Server Page completely defines how the data will be laid out in a Web page to be presented to the user. Accordingly, in step 260, the JSP accesses the bean to obtain the data that is to be incorporated into the Web page as designed by the JSP. As is well known in the art of Web software development, a JSP basically comprises Java code with HTML code throughout it. When the Java code runs, it issues all of the HTML code inside of it to create a Web page. The Java Server Page completely defines how the data will be laid out in a Web page to be presented to the user. Finally, in step 262, the JSP returns a Web page to the browser which contains all of the data defined by the UI record and laid out for presentation to the user in the manner defined by the JSP.

The bean that is instantiated and populated in steps 252 and 254 may be the same bean instantiated in step 234 or a different one. In a preferred embodiment of the invention, in addition to providing the output data for the Web page created by the JSP in steps 258 and 260, it performs all necessary processing of the output business data other than creating the user interface (Web page).

For instance, this may comprise all formatting of the data, such as taking a raw value for the cost of the compact disc and formatting it with a dollar sign ($) and a decimal point between the dollars and cents portions of the price or taking a numeric data code and formatting it as "Jan. 11, 2000".

The bean defines a set of methods that manipulates the business data and returns META information about the business data, but does not include any intelligence about how the data will be presented to the user. Examples of manipulation methods are methods that format numeric data into defined currencies as discussed immediately above, or that validate user input, as discussed in connection with steps 238-240. Examples of META information methods are methods that return labels or HELP text associated with a given field.

Error messages associated with a given field that had user input FAIL as described above in connection with steps 238-240 is one example of META information that has been created during run time.

In essence, the Java bean encapsulates all the relevant information about the business data that is to be put on the Web page but says nothing about how or where or in what form the data will be displayed on that Web page.

Thus, it can be seen that, in accordance with the present invention, the business processing software is entirely separated from the Web presentation (or user interface) software, which is entirely separated from the input data verification programming and the output data formatting programming. The only interaction between the various software components is through the UI record which the back-end returns to the gateway and which the gateway uses to populate a Java bean.

It should be understood by those of skill in the art that, in accordance with the present invention, for each different Web page that can be returned to a user, there would typically be a different JSP and related bean. Further, beans have persistence, i.e., they store the state of a component. This allows, for example, a component (bean) to remember data that a particular has already entered in an earlier user's session.

Thus, a method and apparatus has been presented that allows for separation of business processing programming, Web user-interface programming, input data verification programming, and output data formatting programming in the development of e-business software. All of these software components are enabled to interface with each other through the use of a very simple gateway servlet. This allows existing businesses to expand more easily into e-business since existing business software does not need to be substantially redesigned to convert to e-business application. Further, it makes it easier for any business to develop e-business software since the business processing software development can be done separately from the Web/user-interface software development. Thus, a software developer who is well-versed in a 3GL or 4GL business programming language but has little knowledge of Web application programming languages such as HTML and Java, is not precluded from developing software for Web driven applications.

While the particular embodiments of the invention discussed above all relate to the conduct of a business transaction between a buyer and a seller via the World Wide Web, the invention have much broader application. For instance, it can be used in any data transfer, i.e., request/response data exchange between two programs, and is not necessarily limited to buyer/seller business transactions. Further, the invention is applicable to any computing environment and is not necessarily limited to the World Wide Web or even network environments.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. For example, the embodiments discussed above are particularly related to the Java programming language and are exemplary in nature. It should be understood by those of skill in the related arts that the invention can be applied within the framework of other object oriented programming languages. Accordingly, the foregoing description is by way of example only, and not limiting. The invention is limited only as defined in the following claims and equivalents thereto.

I claim:

1. A computer program product in an object oriented programming language stored on a computer-readable medium for facilitating data transfers between a first program and a second program comprising:

computer executable instructions comprising a Java servlet for receiving a first data set generated by said first program intended for processing by said second program;

computer executable instructions comprising a first Java bean for receiving said first data set from said Java servlet and processing said first data set to assure that said first data set contains proper information for processing by said second program;

computer executable instructions comprising said Java servlet for generating output data indicating whether said first data set contains proper information for processing by said second program;

computer executable instructions comprising said Java servlet for receiving a second data set from said second program comprising information generated from said first data set and that is intended to be used to generate a display, said second data set including no information about how said information is to be displayed;

computer executable instructions comprising a second Java bean for receiving said second data set from said Java servlet and processing said second data set to generate a third data set comprising information that is intended to be used for generating a display on a terminal by a third program; and a Java Server Page comprising computer executable instructions for receiving the third data set from said second Java bean and creating a Web page incorporating said third data set and defining how said information in said third data set is to be displayed.

2. The computer program product of claim 1 wherein said data transfer is conducted over the World Wide Web and said third data set comprises data for insertion into an HTML page.

3. A method for conducting data transfers between a first program and a second program comprising the steps of:

at least one Java servlet receiving a first data set from said first program intended for processing by said second program;

processing said first data set via a first Java bean to assure that said first data set contains proper information for processing by said second program;

generating output data indicating whether said first data set contains proper information for processing by said second program;

said at least one Java servlet receiving a second data set from a said second program comprising data generated from said first data set, said second data set comprising data to be displayed by said first program and including no information about how said data is to be displayed; and processing said second data set via a second Java bean to generate a third data set for display, said third data set including no information about how said data is to be displayed;

sending said third data set to a Java Server Page; and said Java Server Page creating a Web page incorporating said third data set and defining how said information in said third data set is to be displayed.

4. The method of claim 3 wherein:

said step of receiving said first data set comprises instantiating and populating said first Java bean; and said step of receiving said second data set comprises instantiating and populating said second Java bean.

5. The method of claim 4 further comprising the steps of:

sending said output data to said at least one Java servlet; and said at least one Java servlet sending said first data set to said second program for processing.

6. The method of claim 5 wherein said first program is a Web browser and said second program is a business processing program and wherein said data transfer relates to a business transaction.

7. The method of claim 6 wherein said data transfer is via the World Wide Web and said second data set comprises data for insertion into an HTML page to be transmitted to said browser.

8. The method of claim 7 wherein said second data set comprises a set of attributes for said second Java bean that is adapted to be accessed by a Java Server Page.

* * * * *